United States Patent [19]
Singleton, Jr.

[11] 3,963,453
[45] June 15, 1976

[54] BRAZING MATERIALS
[75] Inventor: Ogle R. Singleton, Jr., Richmond, Va.
[73] Assignee: Reynolds Metals Company, Richmond, Va.
[22] Filed: Dec. 10, 1974
[21] Appl. No.: 531,393

[52] U.S. Cl. .................................. 29/197.5; 75/147
[51] Int. Cl.² ......................................... B32B 15/20
[58] Field of Search ............ 75/147, 141, 142, 148, 75/146, 140; 29/197.5, 197; 148/32, 32.5

[56] References Cited
UNITED STATES PATENTS
2,075,517   3/1937   Frost et al............................. 75/147

Primary Examiner—R. Dean
Attorney, Agent, or Firm—Glenn, Palmer, Lyne, Gibbs & Clark

[57] ABSTRACT

An aluminum-silicon brazing composition containing 0.05 to 0.3% tin by weight, with silicon in the range of 7 to 14% and magnesium in the range of 0.2 to 2%, preferably the composition being employed as a cladding layer on a magnesium-containing aluminum base core alloy.

6 Claims, No Drawings

BRAZING MATERIALS

BACKGROUND OF THE INVENTION

This invention pertains generally to the art of joining aluminum alloy components by brazing and, it pertains in particlar to compositions used for vacuum brazing. For purposes of this application the term "vacuum" refers to environments where pressures are beolw $100 \times ^{-3}$ torr and the partial pressures of water and oxidizing species, such as $O_2$, are below $1 \times 10^{-4}$ torr and $8 \times 10^{-4}$ torr, respectively.

As is well known, aluminum alloys containing silicon are appreciated as useful compositions for brazing. Furthermore, it has been recognized that the addition of small amounts of magnesium makes such alloys suitable for vacuum brazing.

In accordance with the present invention, it has been found that a brazing composition consisting essentially of aluminum, silicon, magnesium and tin has especially desirable properties for purposes of vacuum brazing at relatively low pressures, such as below $1 \times 10^{-4}$ torr for example. About 0.1% tin is usually sufficient. For the particular advantages and benefits of the invention, reference is made to the tests and related results and discussion, which are set forth later below.

SUMMARY OF THE INVENTION

This application relates to an improved aluminum-silicon brazing composition for joining aluminum alloy components by vacuum brazing. The composition consists of 7 to 14% silicon, 0.2 to 2% magnesium, 0.05 to 0.3% tin, less than 0.6% iron, 0.3% manganese and 0.15% incidental impurities (less than 0.05% each of Cu, Mn, Ni, Zn, Ti and others), and a balance of aluminum. (Unless otherwise apparent from the context, percentages given in tis application refer to percentages by weight.)

The composition may be used alone in the form of a shim, wire or rod or it may be applied as a cladding on the aluminum alloy components that are desired to be brazed. The cladding may be on one or both sides of the core component, or it may even be sandwiched between core layers, and it typically constitutes from about 5 to 20% of the composite thickness. All these and equivalent embodiments shall for convenience be hereinafter collectively referred to as brazing elements.

DESCRIPTION OF THE PREFERRED EMBODIMENTS

The invention as preferably practiced consists of 9 to 11% silicon, 0.7 to 1.2% magnesium, 0.15 to 0.2% tin, less than 0.15% incidental impurities, and a balance of aluminum.

In particularly effective embodiments the above composition is employed as the outer cladding layer on an aluminum alloy core component, preferably an alloy of the type containing 0.1 to 0.3% magnesium, less than 0.25% copper, 0.3% silicon, 0.4% manganese and 0.15% incidental impurities, and a balance of aluminum, or the type containing 0.4 to 0.8% silicon, 0.25 to 0.4% manganese, 0.4 to 0.8% magnesium, less than 0.8% iron, 0.35% chromium, 0.35% copper, 0.35% zinc and 0.15% incidental impurities, and a balance of aluminum. Suitable core alloys include 1100, 3003, 3004, 3005, 3105, 6063 and 6951.

When using the invention, I prefer to conduct the brazing operations in a low-leak environment at a reduced pressure of about $1 \times 10^{-4}$ torr or lower.

EVALUATION PROCEDURE

As noted earlier, a number of tests were made for the purpose of revealing the qualities of the invention and comparing them to those of other known compositions. These tests were run according to the standard procedure set out below, which is offered, by way of example, to illustrate the practice of the invention.

I. The Six-Tiered Specimen

A typical six-tiered specimen, assembled and ready for brazing, was prepared from seven pieces of cladded alloy sheet, each piece measuring 5 ¼ × 3 ½ × 0.010. The seven pieces were spaced apart in a substantially parallel relation by six sets of cladded alloy components, each component being 0.075 inch thick and 13/32 inch high. In each above set, the components consisted of one section of 3 inch OD tubing and two strips 4 ⅛ inches long, the strips each being bent essentially in the form of a sine wave in the range of $3\pi/2$ to $11\pi/2$ radians.

Assembly of the specimen was substantially as follows. On the first piece of sheet was placed a section of tubing and a pair of bent strips, their respective 13/32 inch height dimensions being perpendicular to the plane of the sheet. The section of tubing occupied a central position on the sheet while the bent strips were located respectively on opposite sides of the tubing so as to span the width of the sheet with their nodes being directed away from the tubing and spaced about one-eighth inch from the respective opposite ends of the sheet. Next, the second piece of sheet was placed on top of the mentioned section of tubing and pair of strips such that its location was directly above the first piece of sheet. The process was the repeated, culminating with the placement of the last piece of sheet on top of the resulting stack.

To provide a vent for the tubing, a circular ½ inch D notch was cut in the top tubing section, the bottom of the notch being spaced about one-sixteenth inch from the lower edge of the section. The vent was made common to the remaining sections by a ½ inch D hole in each of the five innermost pieces of sheet.

Once assembled, the specimen was secured to an oxidized stainless steel carrier for mobility. A thermocouple was positioned in contact with the specimen, so as to provide an indication of specimen temperature.

II. Procedure

The cladded alloy brazing sheet was oiled if handled by hand. Prior to assembly of the specimen, all parts were solvent degreased in perchloroethylene. After degreasing gloves were used to avoid fingermarks on the material.

In a cold wall type of vacuum brazing furnace, assembled specimens were individually subjected to a brazing cycle consisting of the following steps:

1. Vent furnace to air, the furnace walls being heated to about 180°F with hot water.
2. Remove furnace door.
3. Place specimen into the furanace and secure door and apply cool water to the walls.
4. Pump furnace to desired vacuum same time apply heat to the specimen.
5. Bring pressure to below $1 \times 10^{-4}$ torr before the specimen temperature exceeds about 800° to 900°F.

6. Record thermocouple output and system pressure during brazing cycle.

7. After about 18 minutes, when specimen reaches desired brazing temperatur, shut off furnace elements and back fill with nitrogen.

8. When thermocouple indicates less than about 1000°F, apply warm water to the walls, remove the furnace door and extract the specimen for cooling.

9. Replace door and pump down furnace.

Brazed specimens when cooled were removed from the carriers and examined visually. Prior to examination, the specimens were cut in half, the plane of the cut being perpendicular to the planes of th pieces of sheet and parallel to their lengthwise edges. Consequently it was possible to view all filleting in the vicinity of brazed joints.

Specimen evaluation was based on overall filleting ability in terms of uniformity and quality. The goal was to achieve uniform and continuous filleting at all areas of contact between the various parts of a specimen.

Brazing environment was measured as a function of temperature and pressure. Because temperatures were nearly the same from test to tes, however, pressure was the only substantial variable. Pressure was determined with either an ion gauge or a thermocouple gauge.

EVALUATION RESULTS AND DISCUSSION

For test purposes, the invention was embodied in the form of a brazing composition consisting of 10.4% silicon, 0.33% iron, 1.02% magnesium, 0.18% tin, less than 0.15% incidental impurities, and a balance of aluminum. The composition was applied as a cladding to both sides of aluminum alloy sheet, the cladding constituting 15% of the composite thickness. The core alloy consisted of 0.25 to 0.50% silicon, 0.30 to 0.70% iron, 0.30 to 0.50% manganese, 0.20 to 0.40% magnesium, less than 0.10% copper, 0.1% chromium and 0.15% incidental impurities, and a balance of aluminum.

During the test, temperature reached 1110°F with pressure at about $5 \times 10^5$ torr, the pressure always being below $1 \times 10^{-4}$ torr at temperatures above 900°F. Residual gasses were predominantly deleterious water vapor.

The results were surprisingly superior to those obtained using other known brazing compositions under similar conditions. The alloys tested are set forth in the chart below.

| Si | Fe | Mn | Mg | Bi | Pb | Zn | Cu | Ti |
|---|---|---|---|---|---|---|---|---|
| 10.7 | 0.27 | <.01 | 1.07 | <.01 | <.01 | <.01 | <.01 | .01% |
| 9.7 | .25 | .11 | 1.19 | .05 | <.01 | .16 | .26 | .01% |
| 10.4 | .28 | .20 | 2.04 | .08 | <.01 | .01 | <.01 | .01% |
| 10.4 | .27 | .19 | 1.39 | .08 | <.01 | .01 | <.01 | .01% |
| 10.7 | .27 | <.01 | 1.06 | <.01 | .07 | .01 | <.01 | .01% |

-continued

| Si | Fe | Mn | Mg | Bi | Pb | Zn | Cu | Ti |
|---|---|---|---|---|---|---|---|---|
| 10.5 | .21 | <.01 | 1.03 | <.01 | .15 | .01 | <.01 | .01% |

Other tests were run at substantially higher pressures, but under such conditions the tin-containing test alloy proved to be comparatively inferior. Consequently, a the present time, the advantageous use of tin appears limited to relatively low pressure environments, such as below $1 \times 10^{-4}$ torr, for example.

One unexpected revelation of the test results was the marked improvement in the overall filleting ability of the tin-containing composition over the bismuth-containing composition disclosed by copending application, Ser. No. 363,910 filed May 25, 1973, now Pat. No. 3,853,547. This is a special significance insofar as tin is less expensive than bismuth. As mentioned, however, the tin-containing composition displayed an unusual sensitivity to pressure as tested. Accordingly, the invention appears at present to be somewhat less versatile than the Al-Si-Mg-Bi alloys.

What is claimed is:

1. An article which comprises an aluminum alloy core and an outer cladding layer, the outer cladding layer being bonded to one side of the aluminum alloy core and being made of an alloy consisting essentially of 7 to 14% silicon, 0.2 to 2% magnesium, 0.05 to 0.3% tin, less than 0.6% iron, 0.3% manganese and 0.15% incidental impurities, and a balance of aluminum.

2. The article of claim 1 wherein the aluminum alloy core consists of 0.1 to 0.3% magnesium, less than 0.25% copper, 0.3% silicon, 0.4% manganese and 0.15% incidental impurities, and a balance of aluminum.

3. The article of claim 1 wherein the aluminum alloy core consists of 0.4 to 0.8% silicon, 0.25 to 0.4% manganese, 0.4 to 0.8% magnesium less than 0.8% iron, 0.35% chromium, 0.35% copper, 0.35% zinc and 0.15% incidental impurities, and a balance of aluminum.

4. An article which comprises an aluminum alloy core and an outer cladding layer bonded to each side of the aluminum alloy core, each outer cladding layer being made of an alloy consisting essentially of 7 to 14% silicon, 0.2 to 2% magnesium, 0.05 to 0.3% tin, less than 0.6% iron, 0.3% manganese and 0.15% incidental impurities, and a balance of aluminum.

5. The article of claim 4 wherein the aluminum alloy core consists of 0.1 to 0.3% magnesium, less than 0.25% copper, 0.3% silicon, 0.4% manganese and 0.15% incidental impurities, and a balance of aluminum.

6. The article of claim 4 wherein the aluminum alloy core consists of 0.4 to 0.8% silicon, 0.25 to 0.4% manganese, 0.4 to 0.8% magnesium, less than 0.8% iron, 0.35% chromium, 0.35% copper, 0.35% zinc and 0.15% incidental impurities, and a balance of aluminum.

* * * * *